Nov. 5, 1929.  A. F. KOEHLER  1,734,438

FOCUSING LENS MOUNTING

Filed July 23, 1928

INVENTOR
August F. Koehler
BY
Cumpston & Griffith
his ATTORNEYS

Patented Nov. 5, 1929

1,734,438

UNITED STATES PATENT OFFICE

AUGUST F. KOEHLER, OF ROCHESTER, NEW YORK, ASSIGNOR TO BAUSCH & LOMB OPTICAL CO., OF ROCHESTER, NEW YORK, A CORPORATION OF NEW YORK

FOCUSING LENS MOUNTING

Application filed July 23, 1928. Serial No. 294,818.

This invention relates to lens mountings and more particularly it refers to a photographic lens mounting, known as a focusing mounting, wherein a lens element or elements may be moved for the purpose of focusing the lens for different object distances.

In lens mounting of the character described, a focusing scale and a diaphragm aperture scale are generally applied, as by engraving, for instance, to the lens mounting. These scales are usually engraved on the barrel of the mounting or on a collar or flange that forms a part of the mounting and they extend only a fraction of the way around the circumference of the barrel or flange. The focusing scale and diaphragm scale are usually placed adjacent to each other so that the two scales may be observed from the same position.

When a mounting of this character is screwed into a threaded flange on a camera and is properly seated therein, it often happens that the engraved scales will not be located on top of the mounting where they can be conveniently observed. This is due to the fact that the screw threads on the attaching flange of the mounting are not started at the proper point so as to properly match with the threaded flange on the camera to bring the scales on top of a properly seated mounting.

One of the objects of my invention is to provide means whereby a lens mounting may be attached to a camera so that indicia on the mounting may be disposed in any desired position. Another object is to provide attaching means wherein a lens mounting will be freely rotatable and adapted to be selectively locked against rotation. Other objects and advantages reside in certain novel features of construction, arrangement and combination of parts which will hereinafter be more fully described and pointed out in the appended claims.

Referring to the drawings.

Similar reference characters refer to the same parts throughout the several views of the drawing.

Figure 1:
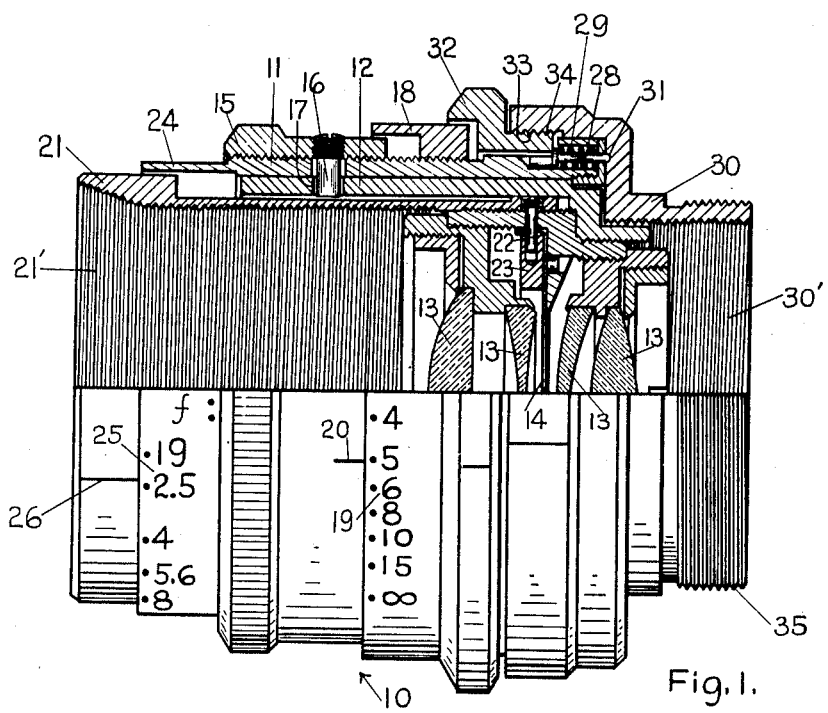
Fig. 1 is a view, partly in section, of a lens mounting embodying my invention.
Figure 2:
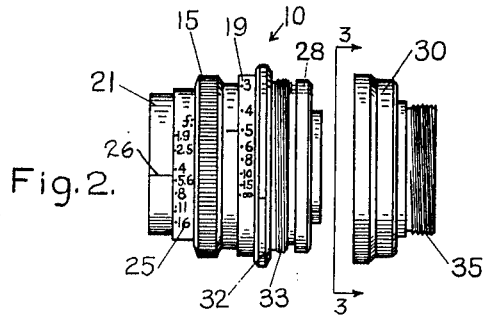
Fig. 2 is a side elevation of the mounting of Fig. 1 showing the attaching flange removed.
Figure 3:
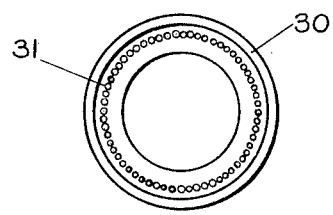
Fig. 3 is a view on line 3—3 looking in the direction of the arrows.
Figure 4:
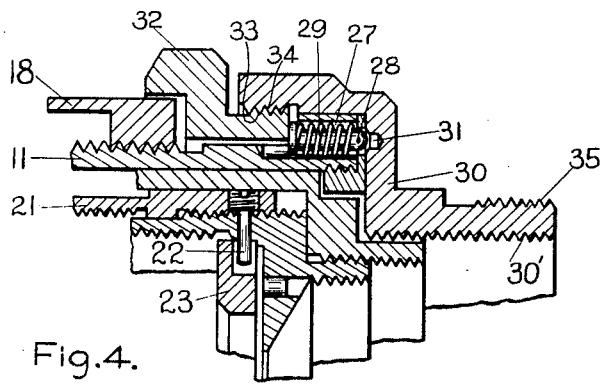
Fig. 4 is an enlarged sectional view showing the details of the locking means.

A preferred embodiment of my invention is shown in the drawings, wherein 10 indicates, generally, a well known form of focusing lens mounting. This mounting comprises a barrel 11 in which is slidably mounted a tubular member 12 carrying lens elements 13 and the usual iris diaphragm 14. Threaded to the outer wall of the barrel 11 is a focusing collar 15 which carries an inwardly projecting pin 16. The slidable member 12 has a spiral cam slot 17 which cooperates with the pin 16, so that by turning focusing collar 15, the lens elements 13, together with the diaphragm 14, may be moved axially to focus the lens for different object distances. A collar member 18 is fixedly secured to barrel 11 and has, on a portion of its circumference, an engraved focusing scale 19 which cooperates with an index mark 20 on focusing collar 15 to indicate the various object distances for which the lens may be focused.

A rotatably mounted tubular member 21 carries a pin 22 which cooperates with the diaphragm ring 23 so that by rotating the member 21 the size of the opening of the iris diaphragm may be varied. A flange 24, extending from barrel 11, carries, on a portion of its circumference, an engraved scale 25 which cooperates with an index mark 26, on the rotatable member 21, to indicate the size of the iris diaphragm opening.

At one end of the barrel 11 there is provided a recess 27 in which is slidably mounted a pin 28 which is surrounded by a coil spring 29. On the inner face of an attaching flange 30 there are provided a plurality of circularly arranged, adjacent depressions or detents 31. A locking ring 32 is mounted to be freely rotatable about and slidable on one end of the barrel 11. The locking ring 32 is provided with a threaded portion 33 which cooperates with the threaded portion 34 on flange 30 whereby the focusing mounting 10 is secured to the attaching flange 30. When the locking ring 32 is screwed tightly into the flange 30, one edge of the ring 32 contacts with the pin 28 and urges it, against the tension of spring 29, into one of the detents 31, thereby locking the lens mounting 10 against rotation with respect to flange 30. For the purpose of reducing troublesome reflections the tubular member 21 is provided with threads or grooves 21' and the flange 30 is similarly provided with threads or grooves 30'.

In operation, my improved mounting is attached to a camera by screwing the threaded portion 35 of flange 30 firmly into a cooperating flange on the lens board or wall of the camera. If, when the mounting is firmly seated in the camera, it should happen that the scales 19 and 25 are not conveniently positioned, the locking ring 32 is loosened. Loosening of locking ring 32 permits the spring 29 to move the pin 28 out of engagement with a detent 31 and thereby releases the locking means. The lens mounting 10 may then be freely rotated with respect to the flange 30 and after the scales 19 and 25 are properly positioned, by turning mounting 10, the locking ring 32 is again tightened to operate the locking means and prevent rotation of mounting 10 relative to the flange 30.

From the foregoing it will be apparent that I am able to attain the objects of my invention and provide means whereby a lens mounting may be rotatably secured to a camera and selectively locked in any desired angular position. It is obvious that various modifications may be made without departing from the spirit of my invention as pointed out in the appended claims.

I claim:

1. The combination of a lens mounting, attaching means rotatably secured to said mounting and means for selectively locking said mounting against rotation relative to said attaching means.

2. The combination of a lens mounting, attaching means therefor in which said mounting is rotatably adjustable and means for securing said mounting in any desired position of adjustment in said attaching means.

3. The combination of a lens mounting, attaching means in which said mounting is rotatably secured and means carried by said mounting for selectively locking said mounting against rotation relative to said attaching means.

4. The combination of a mounting carrying lens elements, attaching means secured to said mounting, said mounting being freely rotatable in said means, and locking means adapted for selectively securing said mounting against rotation in said attaching means.

5. The combination of a lens mounting having lens elements adapted to be moved for focusing, attaching means rotatably secured to said mounting, and locking means for selectively preventing relative rotation between said mounting and attaching means.

6. The combination of a focusing lens mounting having circumferentially disposed scale means, an attaching flange rotatably secured to said mounting and locking means carried by said mounting for selectively securing said mounting in a fixed relation to said flange, whereby said scale means may be disposed in any desired position.

7. The combination of a lens mounting, an attaching flange therefor in which said mounting is rotatably adjustable, and means for securing said mounting in any position of adjustment on said flange comprising a plurality of detents and a cooperating member for selective engagement with any one of said detents for releasably securing said mounting and flange together.

8. The combination of a lens mounting, an attaching flange rotatably secured to said mounting, means for locking said mounting to prevent rotation relative to said flange, said means comprising a member carried by said mounting, said member being adapted for selective cooperation with each of a plurality of detents arranged in said flange.

9. The combination of a lens mounting, a lock ring slidably and rotatably mounted on said mounting, an attaching flange secured to said ring, said flange having a plurality of detents, a yieldable member carried by said mounting and adapted to be urged into contact with one of said detents, whereby said mounting may be selectively positioned and locked against rotation relative to said flange.

10. The combination of a focusing mounting having scale means, a lock ring freely rotatable on said mounting, an attaching flange in threaded engagement with said ring, said flange having a plurality of circularly disposed detents, a spring pressed pin slidably mounted on said mounting adjacent to said ring whereby said ring may urge said pin into contact with one of said detents to selectively lock said mounting in any desired position with respect to said flange.

AUGUST F. KOEHLER.